UNITED STATES PATENT OFFICE.

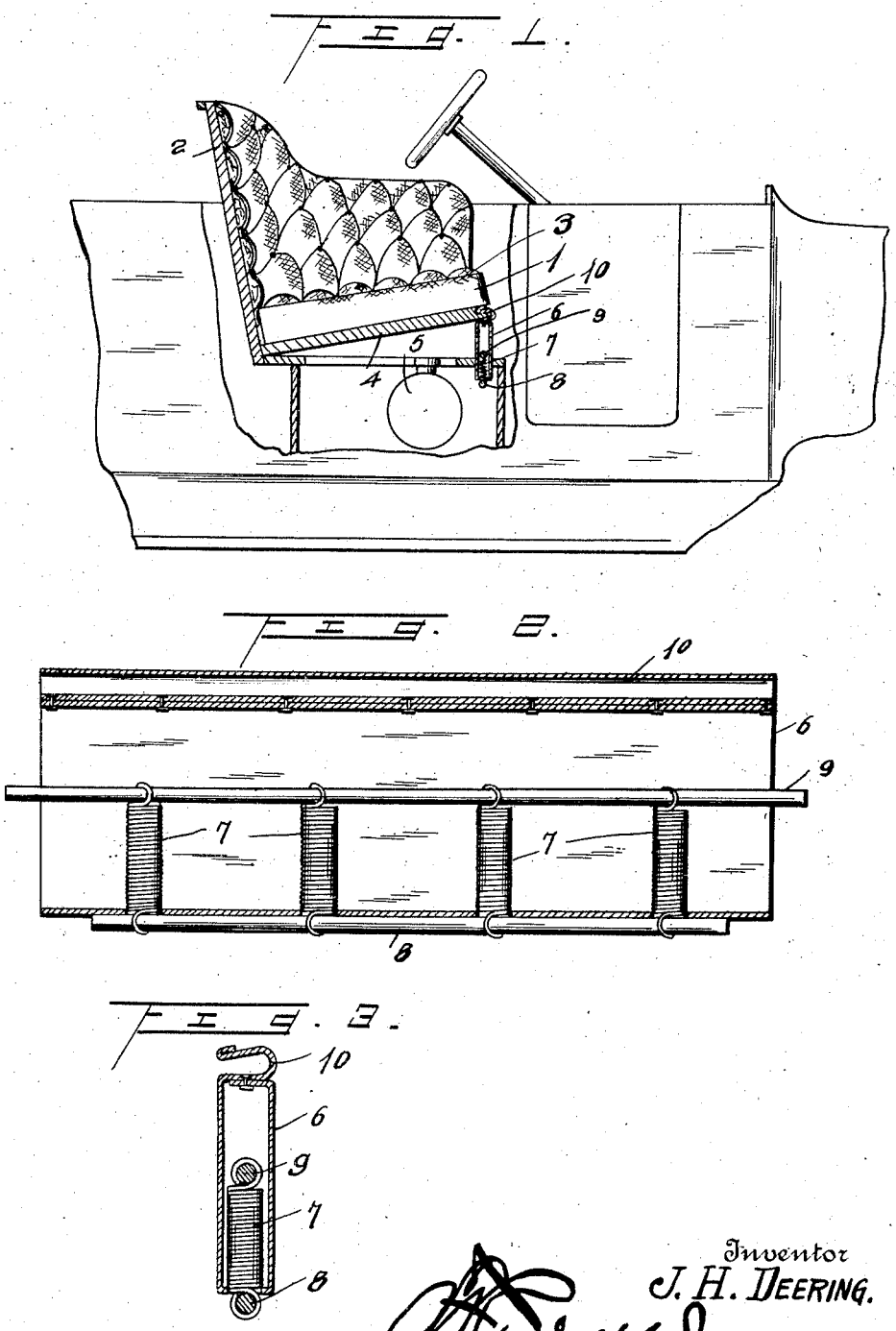

JULIUS H. DEERING, OF BRAINERD, MINNESOTA.

ATTACHMENT FOR AUTOMOBILE-SEATS.

1,340,754. Specification of Letters Patent. Patented May 18, 1920.

Application filed October 31, 1918, Serial No. 260,588. Renewed April 10, 1920. Serial No. 373,001.

*To all whom it may concern:*

Be it known that I, JULIUS H. DEERING, a citizen of the United States, residing at Brainerd, in the county of Crow Wing and State of Minnesota, have invented certain new and useful Improvements in Attachments for Automobile-Seats; and I do hereby declare the following to be a full, clear, and exact description of the invention, such as will enable others skilled in the art to which it appertains to make and use the same.

This invention relates to improvements in attachments for automobile seats and has for one of its objects the provision of means adapted to act as a shock absorber and which will support the front edge of a seat cushion in an elevated position, thus allowing a person's legs to rest on the seat instead of the entire weight of the legs being on the feet, and also will render an increased leg space in the automobile by permitting the person to sit farther back from the steering wheel thus allowing the arms to be straight instead of cramped.

Another object of this invention is the provision of an attachment for automobile seats of the above stated character, which shall be simple, durable and efficient and which may be manufactured and sold at a comparatively low cost.

With these and other objects in view as will become more apparent as the description proceeds, the invention consists in certain novel features of construction, combination, and arrangement of parts, as will be hereinafter more fully described and claimed.

For a complete understanding of my invention, reference is to be had to the following description, and accompanying drawing, in which :—

Figure 1 is a fragmentary vertical sectional view of an automobile illustrating my invention applied thereto, Fig. 2 is an enlarged vertical sectional view of the attachment for automobile seats constructed in accordance with my invention, Fig. 3 is a transverse sectional view of the same.

Referring in detail to the drawing, the numeral 1 indicates the seat frame of an automobile having the usual back rest 2 and seat cushion 3. The seat cushion 3 is provided with a base 4 having the upholstering secured thereon. The seat frame 1 has positioned therein the gasolene or fuel tank 5. The foregoing description relates to a well known construction of automobile and to which my invention is applied.

An elongated casing 6 has each end fully open and has one of its edges provided with a plurality of openings to receive the ends of coil springs 7. The coil springs after passing through the openings have formed thereon loops to receive a retaining rod 8 which secures said springs to the casing. A shaft or rod 9 is secured to the other ends of the springs 7 and has each end projecting beyond the casing for attachment with the upper edge of the seat frame 1. The ends of the rod or shaft are secured to the seat frame 1 in any desired manner, so that the casing is supported upon the seat frame 1 by the springs 7, permitting said casing to move upwardly and downwardly.

The upper edge of the casing 6 has secured thereto a substantially U-shaped flange 10. The flange 10 is of U-shape in cross section and is adapted to receive the forward edge of the base 4 of the seat cushion 3 so that said seat cushion is supported in an upwardly inclined plane as clearly illustrated in Fig. 1. It will therefore be noted that the seat cushion 3 has its forward edge supported in a plane above the rear edge which rests upon the seat frame 1 so that the entire weight of a person's legs may rest upon the seat instead of upon the feet, also permitting the person to sit farther back upon the seat cushion from the steering wheel giving more room to the legs and also to the arms.

It is also to be noted that the springs 7 will permit the forward edge of the seat cushion 3 to move upwardly and downwardly as the vehicle moves over uneven surfaces, acting as a shock absorber.

While I have shown and described the preferred embodiment of my invention, it will be understood that minor changes in construction, combination, and arrangement of parts may be made without departing from the spirit and scope of the invention as claimed.

Having thus described my invention, what I claim is :—

1. An attachment for automobile seats comprising a casing, means securing said casing to the forward edge of a seat cushion, and shock absorbing means within said casing and secured to the seat frame of the automobile.

2. An attachment for automobile seats including a seat frame and a seat cushion, an elongated casing, an attaching flange formed upon the upper edge of the casing and receiving the forward edge of the seat cushion, a plurality of coil springs secured to the other edge of the casing and located wholly within said casing, a rod secured to the other end of said springs and projecting beyond the ends of said casing, and means securing the ends of said rod to a seat frame for supporting the seat cushion in an elevated position and also acting as a shock absorber to the same.

In testimony whereof I affix my signature in presence of two witnesses.

JULIUS H. DEERING.

Witnesses:
M. E. RYAN,
CORA A. CAREL.